United States Patent
Hu et al.

(10) Patent No.: US 10,618,776 B2
(45) Date of Patent: Apr. 14, 2020

(54) BRAKE MEMBER ACTUATION MECHANISM

(71) Applicant: OTIS ELEVATOR COMPANY, Farmington, CT (US)

(72) Inventors: Guohong Hu, Farmington, CT (US); Daryl J. Marvin, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 435 days.

(21) Appl. No.: 15/317,723

(22) PCT Filed: Jun. 10, 2015

(86) PCT No.: PCT/US2015/035083
§ 371 (c)(1),
(2) Date: Dec. 9, 2016

(87) PCT Pub. No.: WO2015/191696
PCT Pub. Date: Dec. 17, 2015

(65) Prior Publication Data
US 2017/0129741 A1   May 11, 2017

Related U.S. Application Data

(60) Provisional application No. 62/011,341, filed on Jun. 12, 2014.

(51) Int. Cl.
*B66B 5/22* (2006.01)
*B66B 5/18* (2006.01)
(Continued)

(52) U.S. Cl.
CPC .............. *B66B 5/22* (2013.01); *B66B 5/18* (2013.01); *F16D 59/02* (2013.01);
(Continued)

(58) Field of Classification Search
CPC combination set(s) only.
See application file for complete search history.

(56) References Cited

U.S. PATENT DOCUMENTS 5,096,020 A * 3/1992 Korhonen ................. B66B 5/22
                                                    187/359
5,226,508 A * 7/1993 Ericson ..................... B66D 5/14
                                                    187/254
(Continued)

FOREIGN PATENT DOCUMENTS

CN     101372302 A    2/2009
CN     103183266 A    7/2013
(Continued)

OTHER PUBLICATIONS

English translation of the First Office Action and Search Report regarding related CN App. No. 201580031260.8; dated Jun. 4, 2018.
(Continued)

*Primary Examiner* — Michael A Riegelman
(74) *Attorney, Agent, or Firm* — Cantor Colburn LLP (57) ABSTRACT

A brake member actuation mechanism for a safety brake member of a hoisted structure includes a brake actuator (12) formed of a ferro-magnetic material configured to be electronically actuated to magnetically engage a guide rail (14) upon detection of the hoisted structure exhibiting a predetermined condition, wherein the magnetic engagement of the brake actuator and the guide rail actuates movement of the safety brake member into a braking position.

4 Claims, 10 Drawing Sheets

(51) Int. Cl.
*F16D 59/02* (2006.01)
*F16D 121/14* (2012.01)
*F16D 121/20* (2012.01)
*F16D 123/00* (2012.01)
*F16D 125/66* (2012.01)

(52) U.S. Cl.
CPC ...... *F16D 2121/14* (2013.01); *F16D 2121/20* (2013.01); *F16D 2123/00* (2013.01); *F16D 2125/66* (2013.01); *F16D 2200/0021* (2013.01)

(56) References Cited

U.S. PATENT DOCUMENTS

| | | | | |
|---|---|---|---|---|
| 5,228,540 | A * | 7/1993 | Glaser | B66B 5/04 187/355 |
| 5,628,385 | A | 5/1997 | Yumura et al. | |
| 5,782,319 | A * | 7/1998 | Woodruff | B66B 5/22 187/376 |
| 6,109,398 | A * | 8/2000 | Lempio | B66B 5/18 187/376 |
| 6,161,653 | A | 12/2000 | Skalski et al. | |
| 6,173,813 | B1 * | 1/2001 | Rebillard | B66B 5/06 187/287 |
| 6,371,261 | B1 * | 4/2002 | Thompson | B66B 5/22 187/370 |
| 6,478,123 | B2 | 11/2002 | Seggebruch et al. | |
| 7,128,189 | B2 | 10/2006 | Maury et al. | |
| 7,299,898 | B2 * | 11/2007 | Husmann | B66B 5/20 187/373 |
| 7,533,763 | B2 | 5/2009 | Kattainen et al. | |
| 7,540,358 | B2 | 6/2009 | Okamoto et al. | |
| 7,575,099 | B2 | 8/2009 | Oh et al. | |
| 7,614,482 | B2 | 11/2009 | Shikai et al. | |
| 7,849,975 | B2 | 12/2010 | Ketonen et al. | |
| 7,954,605 | B2 | 6/2011 | Fonteneau et al. | |
| 8,157,061 | B2 | 4/2012 | Gremaud et al. | |
| 8,177,035 | B2 | 5/2012 | Ueda et al. | |
| 8,307,953 | B2 | 11/2012 | Ferreira | |
| 8,312,972 | B2 * | 11/2012 | Gremaud | B66B 5/22 187/371 |
| 8,408,364 | B2 | 4/2013 | Kangas | |
| 8,534,444 | B2 | 9/2013 | Senger | |
| 8,631,909 | B2 | 1/2014 | Draper et al. | |
| 10,252,884 | B2 * | 4/2019 | Hu | B66B 5/22 |
| 2011/0088983 | A1 * | 4/2011 | Sirigu | B66B 5/22 187/373 |
| 2011/0226560 | A1 | 9/2011 | Husmann | |
| 2011/0308895 | A1 * | 12/2011 | Shen | B66B 5/22 187/359 |
| 2012/0000731 | A1 * | 1/2012 | Schienda | B66B 5/06 187/305 |
| 2013/0081908 | A1 * | 4/2013 | Meierhans | B66B 5/18 187/359 |
| 2013/0133984 | A1 | 5/2013 | Faruk et al. | |
| 2013/0240301 | A1 | 9/2013 | Antti et al. | |
| 2013/0248296 | A1 | 9/2013 | Husmann | |
| 2013/0248298 | A1 * | 9/2013 | Osmanbasic | B66B 5/20 187/359 |
| 2014/0008157 | A1 * | 1/2014 | Terry | B66B 5/18 187/359 |
| 2014/0041967 | A1 * | 2/2014 | Wei | B66B 5/22 187/350 |
| 2015/0240894 | A1 * | 8/2015 | Piech | F16D 63/008 188/163 |
| 2016/0200549 | A1 * | 7/2016 | Billard | B66B 5/22 188/65.1 |
| 2016/0236904 | A1 * | 8/2016 | Witczak | B66B 5/22 |
| 2016/0289045 | A1 * | 10/2016 | Osmanbasic | B66B 5/22 |
| 2017/0001835 | A1 * | 1/2017 | Hu | B66B 5/18 |
| 2017/0066627 | A1 * | 3/2017 | Hu | B66B 5/18 |
| 2017/0107078 | A1 * | 4/2017 | Hu | B66B 5/18 |
| 2017/0129741 | A1 * | 5/2017 | Hu | F16D 59/02 |
| 2017/0217726 | A1 * | 8/2017 | Guilani | B66B 5/22 |
| 2017/0283215 | A1 * | 10/2017 | Hu | B66B 5/22 |
| 2017/0283216 | A1 * | 10/2017 | Marvin | B66B 5/0031 |
| 2017/0283217 | A1 * | 10/2017 | Marvin | B66B 5/0031 |
| 2017/0291797 | A1 * | 10/2017 | Hu | B66B 5/0031 |
| 2017/0291798 | A1 * | 10/2017 | Hu | B66B 5/22 |
| 2018/0162693 | A1 * | 6/2018 | Hu | B66B 5/06 |
| 2018/0162694 | A1 * | 6/2018 | Hu | B66B 5/22 |
| 2018/0282122 | A1 * | 10/2018 | Sudi | B66B 5/0093 |
| 2018/0327224 | A1 * | 11/2018 | Billard | B66B 9/00 |
| 2019/0002238 | A1 * | 1/2019 | Bogli | B66B 5/0025 |
| 2019/0062113 | A1 * | 2/2019 | Hu | B66B 9/00 |

FOREIGN PATENT DOCUMENTS

| | | |
|---|---|---|
| CN | 103231959 A | 8/2013 |
| EP | 1813566 A1 | 8/2007 |
| EP | 2439163 B1 | 3/2014 |
| WO | 2015047391 A1 | 4/2015 |
| WO | 2015191695 A1 | 12/2015 |

OTHER PUBLICATIONS

English translation of the First Office Action and Search Report regarding related CN App. No. 201580031374.2; dated Jun. 4, 2018.
Search Report regarding related App. No. PCT/US2015/035083; dated Aug. 20, 2015.
Search Report regarding related App. No. PCT/US2015/035080; dated Aug. 19, 2015.
International Preliminary Report on Patentability regarding related PCT App. No. US2015/035080; dated dated Dec. 15, 2016; 8 pgs.
International Preliminary Report on Patentability regarding related PCT App. No. US2015/035083; dated Dec. 15, 2019; 7 pgs.

* cited by examiner

BRAKE MEMBER ACTUATION MECHANISM

CROSS-REFERENCES TO RELATED APPLICATIONS

This patent application claims the benefit of priority to International Patent Application Serial No. PCT/US2015/035083, filed Jun. 10, 2015, and claims the benefit of priority to U.S. Provisional Patent Application Ser. No. 62/011,341, filed Jun. 12, 2014, each of which are incorporated herein by reference in their entirety.

BACKGROUND OF THE INVENTION

The embodiments herein relate to braking systems and, more particularly, to a brake member actuation mechanism for braking systems, such as those employed to assist in braking a hoisted structure.

Hoisting systems, such as elevator systems and crane systems, for example, often include a hoisted structure (e.g., elevator car), a counterweight, a tension member (e.g., rope, belt, cable, etc.) that connects the hoisted structure and the counterweight. During operation of such systems, a safety braking system is configured to assist in braking the hoisted structure relative to a guide member, such as a guide rail, in the event the hoisted structure exceeds a predetermined velocity or acceleration.

Prior attempts to actuate a braking device typically require a mechanism that includes a governor, a governor rope, a tension device and a safety actuation module. The safety actuation module comprises lift rods and linkages to actuate the safeties, also referred to as a braking device. Reducing, simplifying or eliminating components of this mechanism, while providing a reliable and stable braking of the hoisted structure, would prove advantageous.

BRIEF DESCRIPTION OF THE INVENTION

According to one embodiment, a braking system for a hoisted structure includes a guide rail configured to guide movement of the hoisted structure. Also included is a first brake member operatively coupled to the hoisted structure and having a brake surface configured to frictionally engage the guide rail, the first brake member moveable between a braking position and a non-braking position. Further included is a brake member actuation mechanism operatively coupled to the first brake member and configured to actuate the first brake member from the non-braking position to the braking position. The brake member actuation mechanism includes a container operatively coupled to the first brake member. The brake member actuation mechanism also includes a brake actuator formed of a ferro-magnetic material disposed within the container and configured to be electronically actuated to magnetically engage the guide rail upon detection of the hoisted structure exhibiting a predetermined condition, wherein the magnetic engagement of the brake actuator and the guide rail actuates movement of the first brake member into the braking position.

In addition to one or more of the features described above, or as an alternative, further embodiments may include that the brake actuator comprises a contact surface configured to magnetically engage the guide rail, wherein at least a portion of the contact surface includes a textured surface, wherein the brake actuator further comprises a tapered portion.

In addition to one or more of the features described above, or as an alternative, further embodiments may include that the container is directly coupled to the first brake member.

In addition to one or more of the features described above, or as an alternative, further embodiments may include that the container is indirectly coupled to the first brake member.

In addition to one or more of the features described above, or as an alternative, further embodiments may include that the predetermined condition comprises at least one of an over-acceleration condition and an over-speed condition.

In addition to one or more of the features described above, or as an alternative, further embodiments may include that the brake member actuation mechanism includes a brake actuator housing that directly contains the brake actuator. Also included is a slider at least partially surrounding the brake actuator housing and slidably disposed within the container.

In addition to one or more of the features described above, or as an alternative, further embodiments may include that the container comprises a first wall that defines a first slot and an opposing second wall that defines a second slot, wherein the first slot and the second slot are substantially aligned with each other about a common plane.

In addition to one or more of the features described above, or as an alternative, further embodiments may include that the slider comprises a first guiding protrusion extending through the first slot of the container and configured to slide therein and a second guiding protrusion extending through the second slot of the container and configured to slide therein.

In addition to one or more of the features described above, or as an alternative, further embodiments may include that the first guiding protrusion and the second guiding protrusion are each surrounded by a bushing.

In addition to one or more of the features described above, or as an alternative, further embodiments may include a latch operatively coupled to the slider and configured to selectively retain the brake actuator housing in a non-engaged position.

In addition to one or more of the features described above, or as an alternative, further embodiments may include that each of the container, the brake actuator, the brake actuator housing, and the slider comprise a substantially rectangular geometry.

In addition to one or more of the features described above, or as an alternative, further embodiments may include that a spring disposed within the container and configured to propel the brake actuator toward the guide rail.

In addition to one or more of the features described above, or as an alternative, further embodiments may include an electromagnetic component having a coil configured to actuate the brake member actuation mechanism during an energized condition of the coil.

According to another embodiment, a braking system for a hoisted structure includes a guide rail configured to guide movement of the hoisted structure. Also included is a first brake member operatively coupled to the hoisted structure and having a brake surface configured to frictionally engage the guide rail, the first brake member moveable between a braking position and a non-braking position. Further included is a brake member actuation mechanism configured to actuate the first brake member from the non-braking position to the braking position. The brake member actuation mechanism includes a container portion integrally formed within the first brake member. The brake member actuation mechanism also includes a brake actuator housing disposed within the container portion and configured to translate within the container portion. The brake member actuation mechanism further includes a brake actuator formed of a ferro-magnetic material operatively coupled to an end of the brake actuator housing and configured to magnetically engage the guide rail upon detection of the hoisted structure exhibiting a predetermined condition, wherein the magnetic engagement of the brake actuator and the guide rail actuates movement of the first brake member into the braking position.

In addition to one or more of the features described above, or as an alternative, further embodiments may include that the brake actuator comprises a brake pad formed of a metallic material and configured to magnetically engage the guide rail.

In addition to one or more of the features described above, or as an alternative, further embodiments may include a bumper protruding from the brake actuator to dampen the shock force associated with magnetic engagement of the brake pad with the guide rail.

In addition to one or more of the features described above, or as an alternative, further embodiments may include that the predetermined condition comprises at least one of an over-acceleration condition and an over-speed condition.

In addition to one or more of the features described above, or as an alternative, further embodiments may include a spring disposed within the container and configured to propel the brake actuator toward the guide rail.

In addition to one or more of the features described above, or as an alternative, further embodiments may include that the container and the brake actuator housing comprise a substantially circular geometry.

According to yet another embodiment, a brake member actuation mechanism for a safety brake member of a hoisted structure includes a brake actuator formed of a ferro-magnetic material configured to be electronically actuated to magnetically engage a guide rail upon detection of the hoisted structure exhibiting a predetermined condition, wherein the magnetic engagement of the brake actuator and the guide rail actuates movement of the safety brake member into a braking position.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
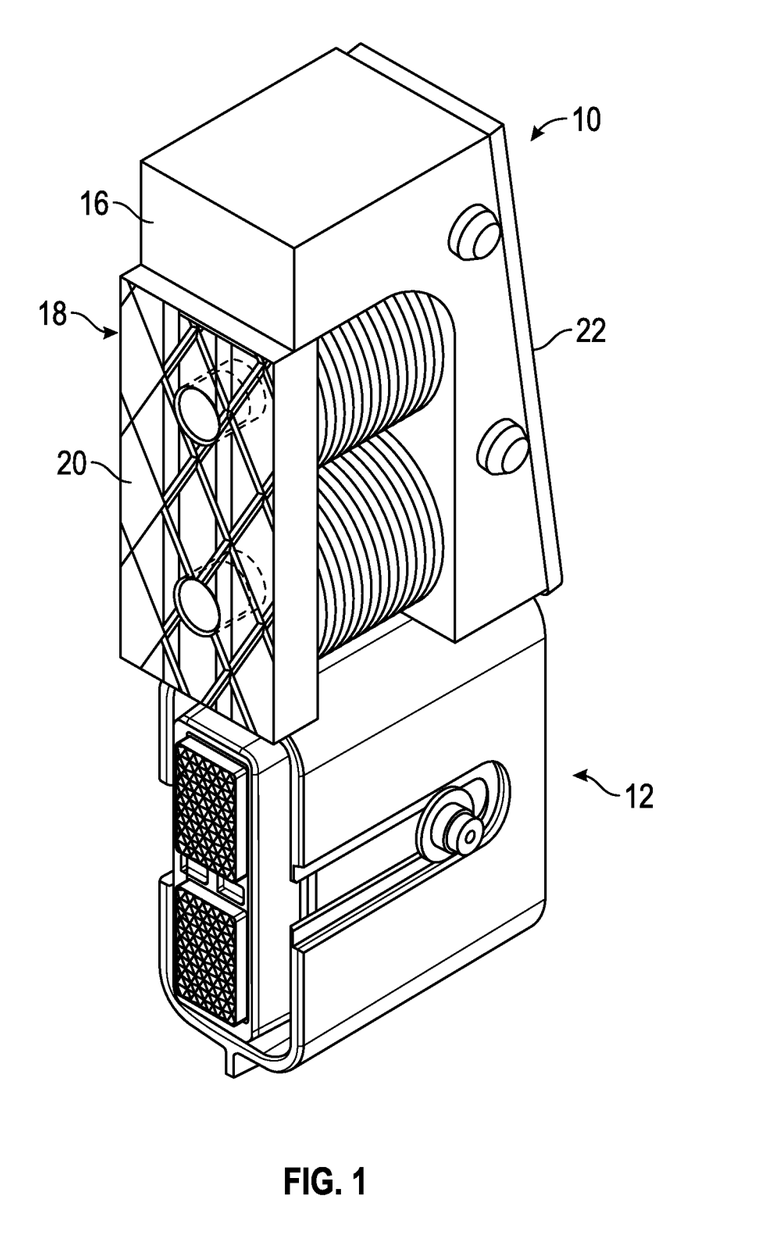
FIG. 1 is a perspective view of a braking system for a hoisted structure according to a first embodiment.
Figure 2:
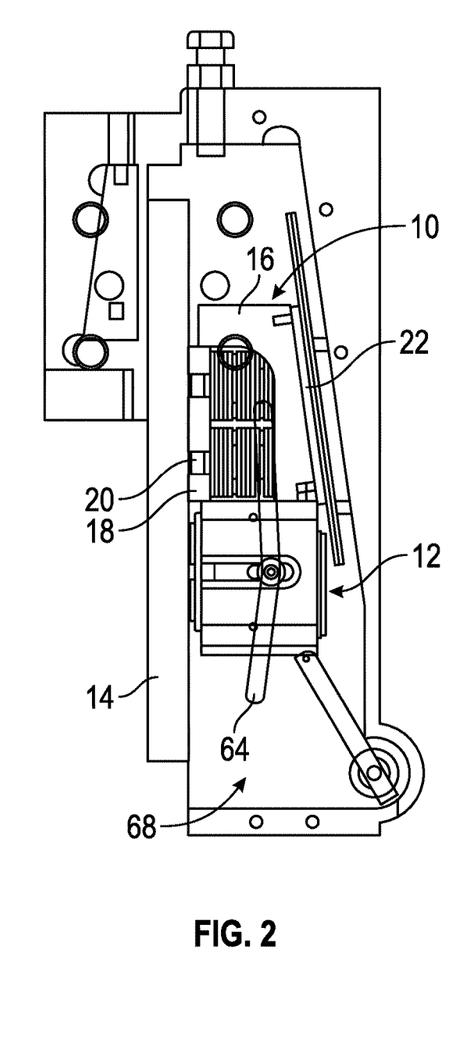
FIG. 2 is a schematic illustration of the braking system of FIG. 1 in a non-braking position.
Figure 3:
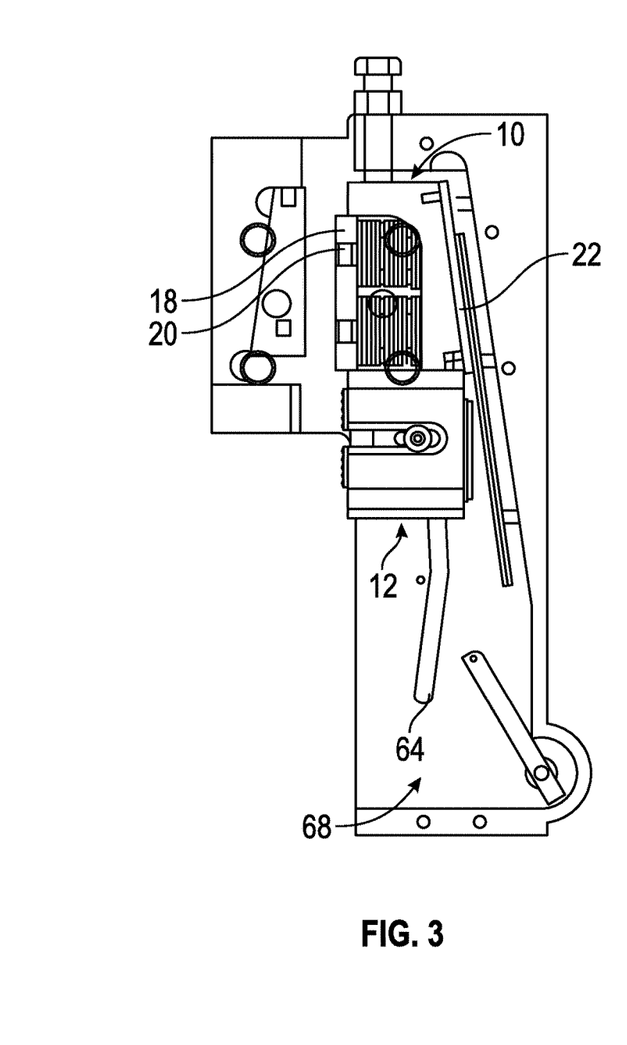
FIG. 3 is a schematic illustration of the braking system of FIG. 1 in a braking position.

Referring to FIGS. 1-3, a brake member assembly 10 and an embodiment of a brake member actuation mechanism 12 are illustrated. The embodiments described herein relate to an overall braking system that is operable to assist in braking (e.g., slowing or stopping movement) of a hoisted structure (not illustrated) relative to a guide member, as will be described in detail below. The brake member assembly 10 and brake member actuation mechanism 12 can be used with various types of hoisted structures and various types of guide members, and the configuration and relative orientation of the hoisted structure and the guide member may vary. In one embodiment, the hoisted structure comprises an elevator car moveable within an elevator car passage.

Referring to FIGS. 2 and 3, with continued reference to FIG. 1, the guide member, referred to herein as a guide rail 14, is connected to a sidewall of the elevator car passage and is configured to guide the hoisted structure, typically in a vertical manner. The guide rail 14 may be formed of numerous suitable materials, typically a durable metal, such as steel, for example. Irrespective of the precise material selected, the guide rail 14 is a ferro-magnetic material.

The brake member assembly 10 includes a mounting structure 16 and a brake member 18. The brake member 18 is a brake pad or a similar structure suitable for repeatable braking engagement with the guide rail 14. The mounting structure 16 is connected to the hoisted structure and the brake member 18 is positioned on the mounting structure 16 in a manner that disposes the brake member 18 in proximity with the guide rail 14. The brake member 18 includes a contact surface 20 that is operable to frictionally engage the guide rail 14. As shown in FIGS. 2 and 3, the brake member assembly 10 is moveable between a non-braking position (FIG. 2) to a braking position (FIG. 3). The non-braking position is a position that the brake member assembly 10 is disposed in during normal operation of the hoisted structure.

In particular, the brake member 18 is not in contact with the guide rail 14 while the brake member assembly 10 is in the non-braking position, and thus does not frictionally engage the guide rail 14. The brake member assembly 10 is composed of the mounting structure 16 in a manner that allows translation of the brake member assembly 10 relative to an outer component 68. Subsequent to translation of the brake member assembly 10, and more particularly the brake member 18, the brake member 18 is in contact with the guide rail 14, thereby frictionally engaging the guide rail 14. The mounting structure 16 includes a tapered wall 22 and the brake member assembly 10 is formed in a wedge-like configuration that drives the brake member 18 into contact with the guide rail 14 during movement from the non-braking position to the braking position. In the braking position, the frictional force between the contact surface 20 of the brake member 18 and the guide rail 14 is sufficient to stop movement of the hoisted structure relative to the guide rail 14. Although a single brake member is illustrated and described herein, it is to be appreciated that more than one brake member may be included. For example, a second brake member may be positioned on an opposite side of the guide rail 14 from that of the brake member 18, such that the brake members work in conjunction to effect braking of the hoisted structure.

Referring now to FIGS. 4-8, the brake member actuation mechanism 12 is illustrated in greater detail. The brake member actuation mechanism 12 is selectively operable to actuate movement of the brake member 18 from the non-braking position to the braking position.

Figure 4:
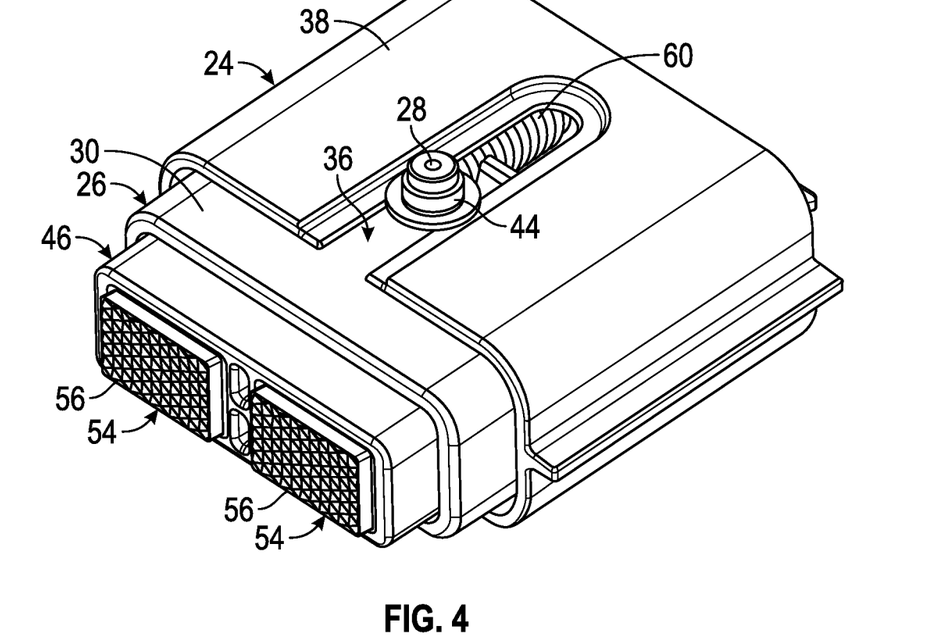
FIG. 4 is a front perspective view of a brake member actuation mechanism of the braking system of FIG. 1.
Figure 5:
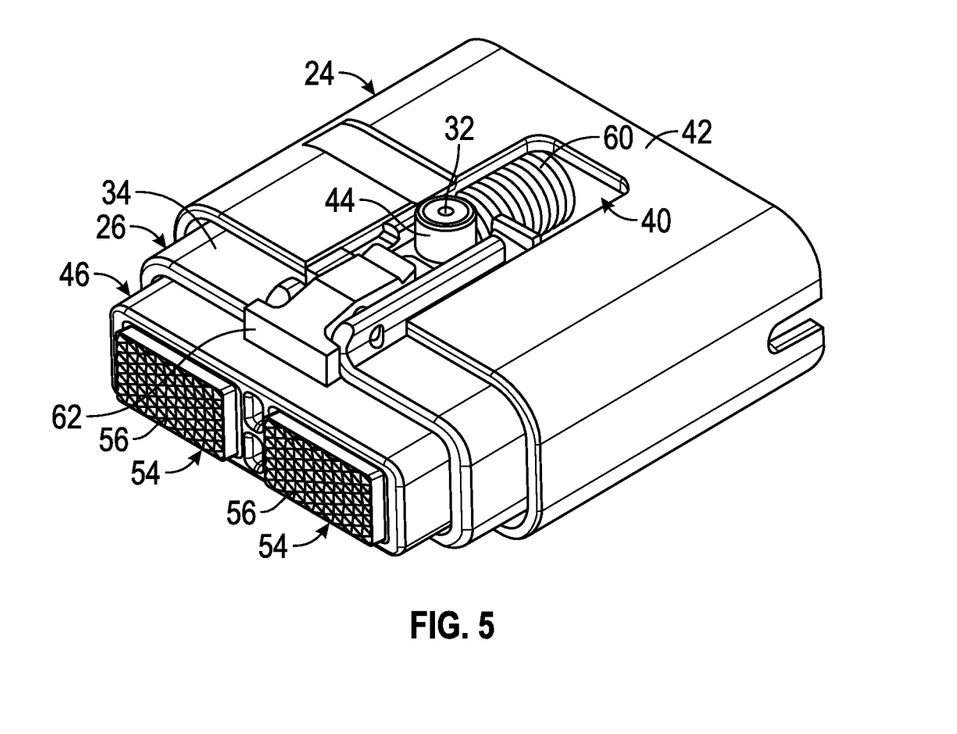
FIG. 5 is a rear perspective view of the brake member actuation mechanism of the braking system of FIG. 1.
Figure 8:
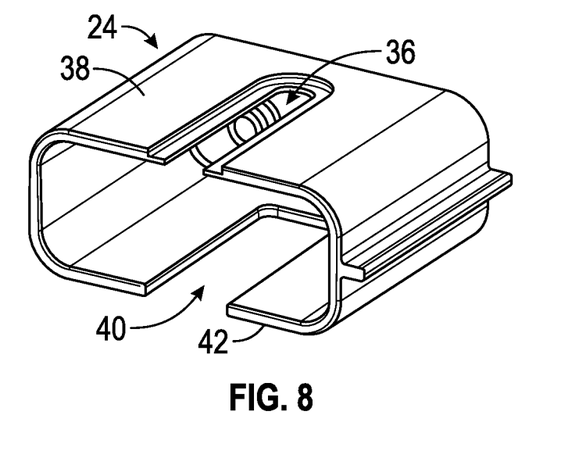
FIG. 8 is a perspective view of a container of the brake member actuation mechanism of the braking system of FIG. 1.
Figure 9:
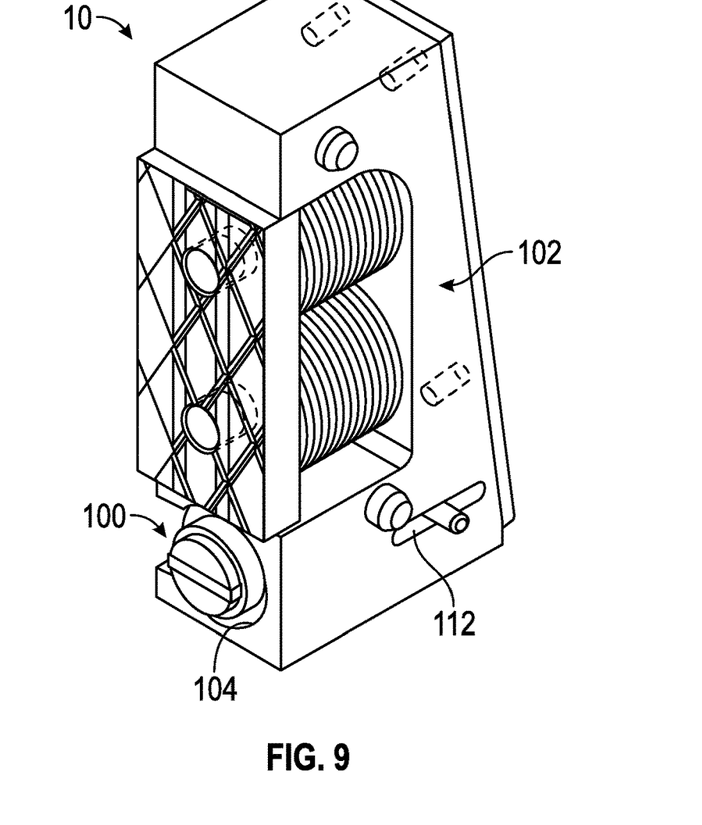
FIG. 9 is a perspective view of a braking system for a hoisted structure according to a second embodiment.
Figure 10:
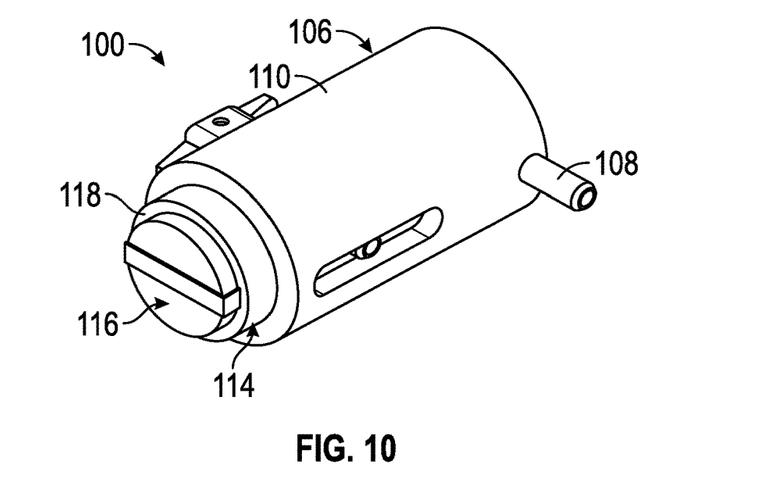
FIG. 10 is a perspective view of a brake member actuation mechanism of the braking system of FIG. 9.

The brake member actuation mechanism 12 is formed of multiple components that are disposed within each other in a layered manner, with certain components slidably retained within other components. A container 24 is an outer member that houses several components, as will be described in detail below. The container 24 is formed of a generally rectangular cross-section and is operatively coupled to the brake member assembly 10, either directly or indirectly. The operative coupling is typically made with mechanical fasteners, but alternate suitable joining methods are contemplated.

Fitted within the container 24 is a slider 26 that is retained within the container 24, but is situated in a sliding manner relative to the container 24. The slider 26 is formed of a substantially rectangular cross-section. The slider 26 includes a first protrusion 28 extending from a first side 30 of the slider 26 and a second protrusion 32 extending from a second side 34 of the slider 26. The protrusions 28, 32 are oppositely disposed from each other to extend in opposing directions relative to the main body of the slider 26. The protrusions 28, 32 are each situated at least partially within respective slots defined by the container. In particular, the first protrusion 28 is at least partially defined within, and configured to slide within, a first slot 36 defined by a first wall 38 of the container 24 and the second protrusion 32 is at least partially defined within, and configured to slide within, a second slot 40 defined by a second wall 42 of the container 24. Fitted on each of the protrusions 28, 32 is a respective bushing 44. The protrusions 28, 32 and the slots 36, 40 are on opposing walls and provide symmetric guiding of the slider 26 during sliding movement within the container 24. The symmetric guiding of the slider, in combination with the bushings 44, provide stable motion and minimized internal friction associated with relative movement of the slider 26 and the container 24.

Figure 6:
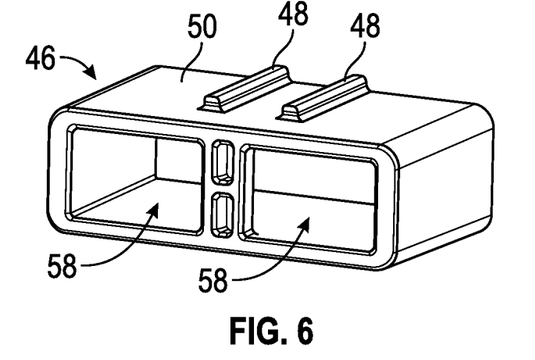
FIG. 6 is a perspective view of a brake actuator housing of the brake member actuation mechanism of the braking system of FIG. 1.
Figure 7:
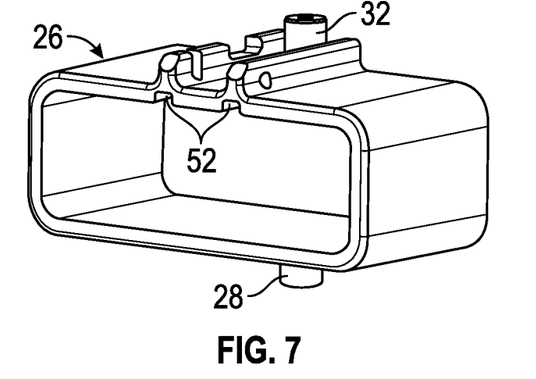
FIG. 7 is a perspective view of a slider of the brake member actuation mechanism of the braking system of FIG. 1.

Disposed within the slider 26 is a brake actuator housing 46 that is formed of a substantially rectangular cross-sectional geometry, as is the case with the other layered components (i.e., container 24 and slider 26). The brake actuator housing 46 is configured to move relative to the slider 26 in a sliding manner. The sliding movement of the brake actuator housing 46 within the slider 26 may be at least partially guided by one or more guiding members 48 in the form of protrusions that extend from an outer surface 50 of the brake actuator housing 46. The slider 26 includes corresponding guiding tracks 52 formed within an inner surface of the slider 26. The brake actuator housing 46 is sized to fit within the slider 26, but it is to be appreciated that a predetermined gap may be present between the brake actuator housing 46 and the slider 26 to form a small degree of "play" between the components during relative movement.

A brake actuator 54 is disposed within the brake actuator housing 46 and, as with the other components of the brake member actuation mechanism 12, the brake actuator 54 is formed of a substantially rectangular cross-sectional geometry. The brake actuator 54 is formed of a ferro-magnetic material. A contact surface 56 of the brake actuator 54 includes a textured portion that covers all or a portion of the contact surface 56. The textured portion refers to a surface condition that includes a non-smooth surface having a degree of surface roughness. The contact surface 56 of the brake actuator 54 is defined as the portion of the brake actuator 54 that is exposed through one or more apertures 58 of the brake actuator housing 46.

In operation, an electronic sensor and/or control system (not illustrated) is configured to monitor various parameters and conditions of the hoisted structure and to compare the monitored parameters and conditions to at least one predetermined condition. In one embodiment, the predetermined condition comprises velocity and/or acceleration of the hoisted structure. In the event that the monitored condition (e.g., over-speed, over-acceleration, etc.) exceeds the predetermined condition, the brake actuator 54 is actuated to facilitate magnetic engagement of the brake actuator 54 and the guide rail 14. Various triggering mechanisms or components may be employed to actuate the brake member actuation mechanism 12, and more specifically the brake actuator 54. In the illustrated embodiment, two springs 60 are located within the container 24 and are configured to exert a force on the brake actuator housing 46 to initiate actuation of the brake actuator 54 when latch member 62 is triggered. Although two springs are referred to above and illustrated, it is to be appreciated that a single spring may be employed or more than two springs. Irrespective of the number of springs, the total spring force is merely sufficient to overcome an opposing retaining force exerted on the brake actuator housing 46 and therefore the brake actuator 54. The retaining force comprises friction and a latch member 62 that is operatively coupled to the slider 26 and configured to engage the brake actuator housing 46 in a retained position.

As the brake actuator 54 is propelled toward the guide rail 14, the magnetic attraction between the brake actuator 54 and the guide rail 14 provides a normal force component included in a friction force between the brake actuator 54 and the guide rail 14. As described above, a slight gap may be present between the brake actuator housing 46 and the slider 26. Additionally, a slight gap may be present between the slider 26 and the container 24. In both cases, the side walls of the container 24 and/or the slider 26 may be tapered to define a non-uniform gap along the length of the range of travel of the slider 26 and/or the brake actuator housing 46. As noted above, a degree of play between the components provides a self-aligning benefit as the brake actuator 54 engages the guide rail 14. In particular, the normal force, and therefore the friction force, is maximized by ensuring that the entire contact surface 56 of the brake actuator 54 is in flush contact with the guide rail 14. The engagement is further enhanced by the above-described textured nature of the contact surface 56. Specifically, an enhanced friction coefficient is achieved with low deviation related to the surface condition of the guide rail 14. As such, a desirable friction coefficient is present regardless of whether the surface of the guide rail 14 is oiled or dried.

Upon magnetic engagement between the contact surface 56 of the brake actuator 54 and the guide rail 14, the frictional force causes the overall brake member actuation mechanism 12 to move upwardly relative to slots 64 within the outer component 68, such as a guiding block and/or cover (FIGS. 2 and 3). The relative movement of the brake member actuation mechanism 12 actuates similar relative movement of the brake member assembly 10. The relative movement of the brake member assembly 10 forces the contact surface 20 of the brake member 18 into frictional engagement with the guide rail 14, thereby moving to the braking position and slowing or stopping the hoisted structure, as described in detail above.

Referring now to FIGS. 9-12, a brake member actuation mechanism 100 according to another embodiment is illustrated. The brake member actuation mechanism 100 is configured to actuate movement of the brake member assembly 10 from the non-braking position to the braking position. The structure and function of the brake member assembly 10, including the brake member 18 that includes the contact surface 20 that frictionally engages the guide rail 14 in the braking position, has been described above in detail. The illustrated embodiment provides an alternative structure for actuating braking of the hoisted structure. As with the embodiments described above, two or more brake assemblies (e.g., brake members with a contact surface), as well as two or more brake member actuation mechanisms may be included to effect braking of the hoisted structure.

As shown, a single component, which may be wedge-like in construction, forms a body 102 for both the brake member assembly 10 and the brake member actuation mechanism 100. The brake member actuation mechanism 100 includes a container 104. In one embodiment, the container 104 is a cavity defined by the body 102, thereby being integrally formed therein. In another embodiment, the container 104 is an insert that is fixed within the body 102. In the illustrated embodiment, the container 104 is formed of a substantially circular cross-sectional geometry, however, it is to be understood that alternative geometries may be suitable.

Figure 11:
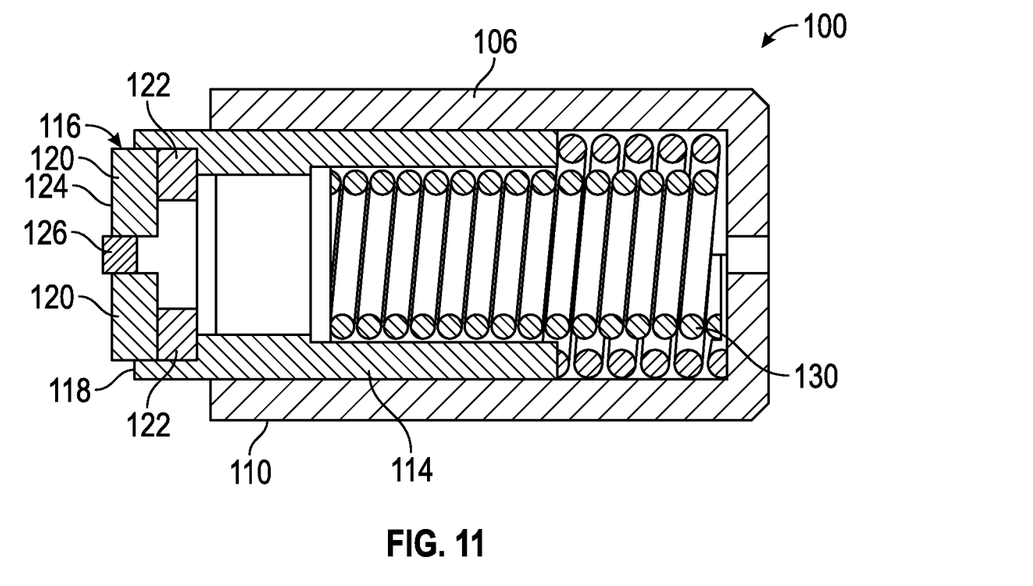
FIG. 11 is a cross-sectional view of the brake member actuation mechanism of the braking system of FIG. 9.

Fitted within the container 104 is a slider 106 that is retained within the container 104, but is situated in a sliding manner relative to the container 104. The slider 106 is formed of a substantially circular cross-section, but alternative suitable geometries are contemplated as is the case with the container 104. The slider 106 includes at least one protrusion 108 extending from an outer surface 110 of the slider 106. The protrusion 108 is situated at least partially within a slot 112 defined by the container 104 and extends through the body 102. In particular, the protrusion 108 is configured to slide within the slot 112.

Disposed within the slider 106 is a brake actuator housing 114 that is formed of a substantially circular cross-sectional geometry, as is the case with the other layered components (i.e., container 104 and slider 106), but alternative suitable geometries are contemplated. The brake actuator housing 114 is configured to move relative to the slider 106 in a sliding manner.

Figure 12:
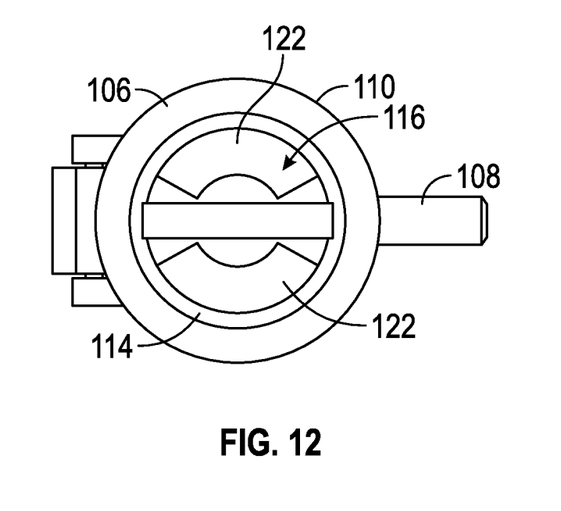
FIG. 12 is a front view of the brake member actuation mechanism of the braking system of FIG. 9.

A brake actuator 116 is located proximate an end 118 of the brake actuator housing 114. The brake actuator 116 comprises at least one brake pad 120 that is formed of a ferro-magnetic material and one or more magnets 122. In one embodiment, the at least one magnet 122 is a half-ring magnet. The term half-ring magnet is not limited to precisely a semi-circle. Rather, any ring segment may form the magnet 122 portion(s). The at least one brake pad 120 disposed on an outer end of the magnet 122 is a metallic material configured to form a contact surface 124 of the brake actuator 116. The contact surface 124 is configured to engage the guide rail 14 and effect a friction force to actuate the brake member assembly 10 from the non-braking position to the braking position. A bumper 126 may be included to reduce the shock force associated with the initial contact between the brake pad 120 and the guide rail 14, which is particularly beneficial if the brake pad metallic material is brittle.

As described in detail above with respect to alternative embodiments, an electronic sensor and/or control system (not illustrated) is configured to monitor various parameters and conditions of the hoisted structure and to compare the monitored parameters and conditions to at least one predetermined condition. In response to the detection of the hoisted structure exhibiting the predetermined condition, a triggering mechanism or component propels the brake actuator 116 into magnetic engagement with the guide rail 14. In one embodiment, a single or dual spring 130 arrangement is employed and is located within the container 104 and is configured to exert a force on the brake actuator housing 114 and/or the slider 106 to initiate actuation of the brake member actuation mechanism 100.

The magnetic engagement of the brake actuator 116 and the guide rail 14 has been described in detail above, as well as the actuation of the brake member assembly 10 from the non-braking position to the braking position, such that duplicative description is omitted for clarity.

Figure 13:
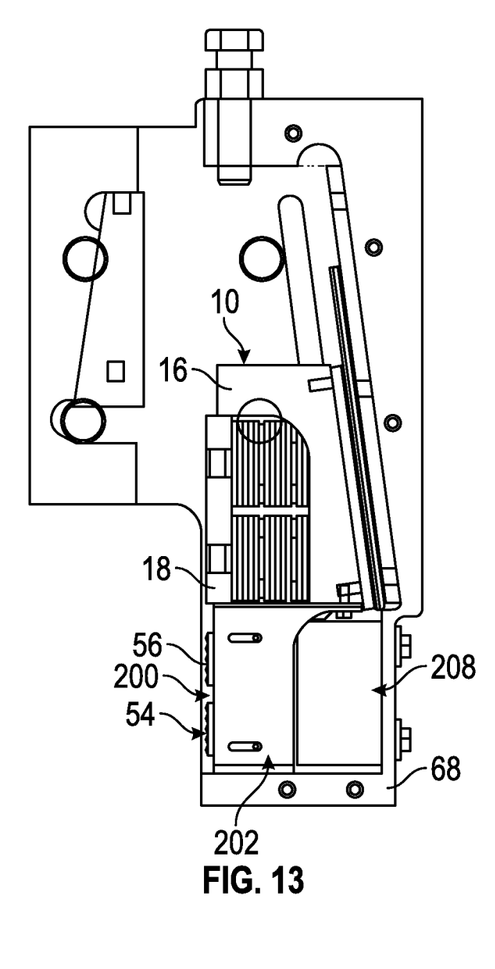
FIG. 13 is a schematic illustration of the braking system according to another embodiment in a non-braking position.
Figure 14:
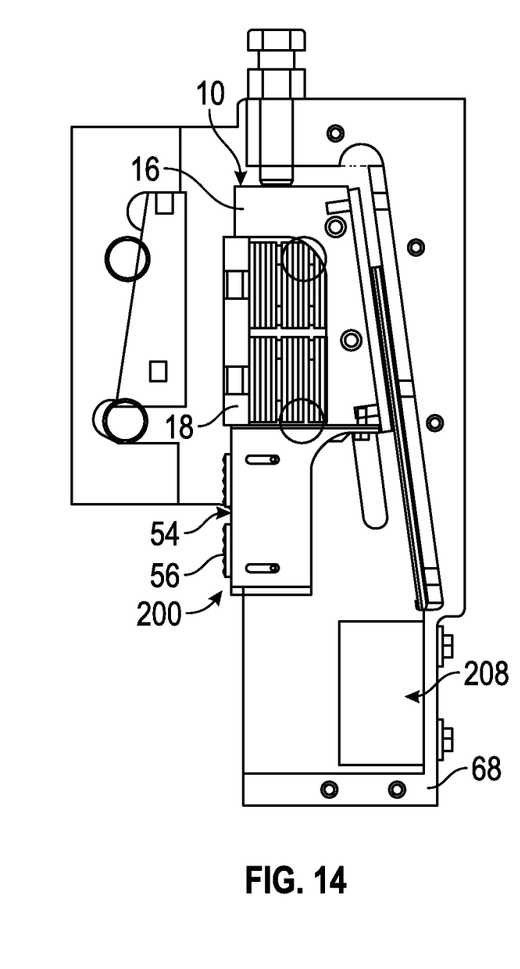
FIG. 14 is a schematic illustration of the braking system of FIG. 13 in a braking position.

Referring now to FIGS. 13 and 14, a brake member actuation mechanism 200 according to another embodiment is illustrated. The brake member actuation mechanism 200 is configured to actuate movement of the brake member assembly 10 from the non-braking position (FIG. 13) to the braking position (FIG. 14). The structure and function of the brake member assembly 10, including the brake member 18 that includes the contact surface 20 that frictionally engages the guide rail 14 in the braking position, has been described above in detail. The illustrated embodiment provides an alternative structure for actuating braking of the hoisted structure.

Figure 15:
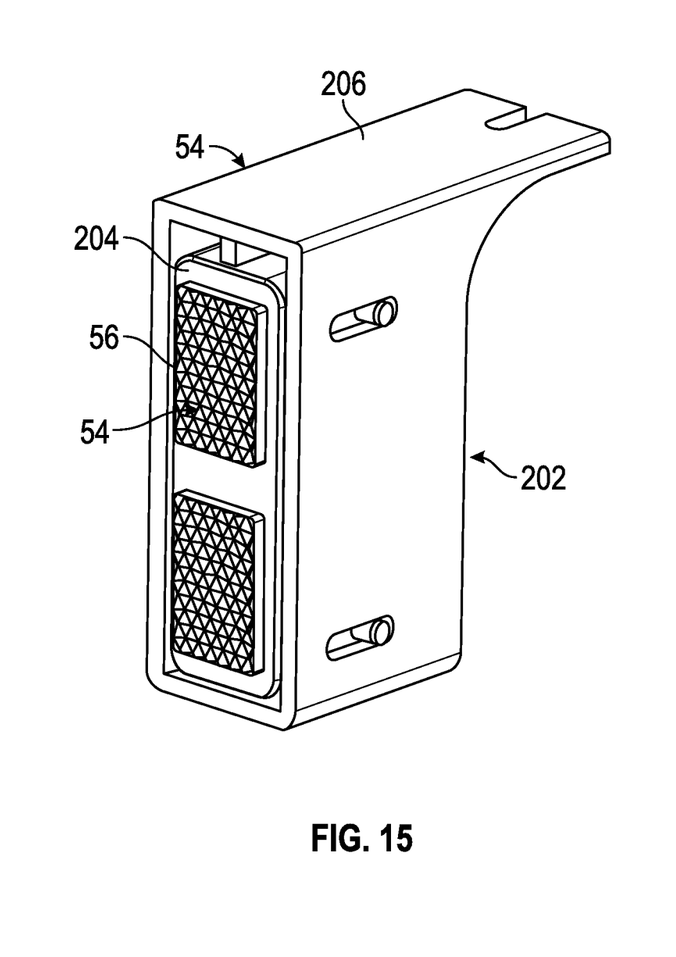
FIG. 15 is a perspective view of a permanent magnet portion of the a brake member actuation mechanism of the braking system of FIG. 13.

The brake member actuation mechanism 200 comprises two main components. A permanent magnet portion 202 (FIG. 15) includes the brake actuator 54 that is disposed within at least one brake actuator housing, such as an inner housing 204 and an outer housing 206, with the outermost housing being operatively coupled to the brake member assembly 10. The brake actuator 54 is formed of a ferro-magnetic material and includes the contact surface 56 having a textured portion that covers all or a portion of the contact surface 56.

Figure 16:
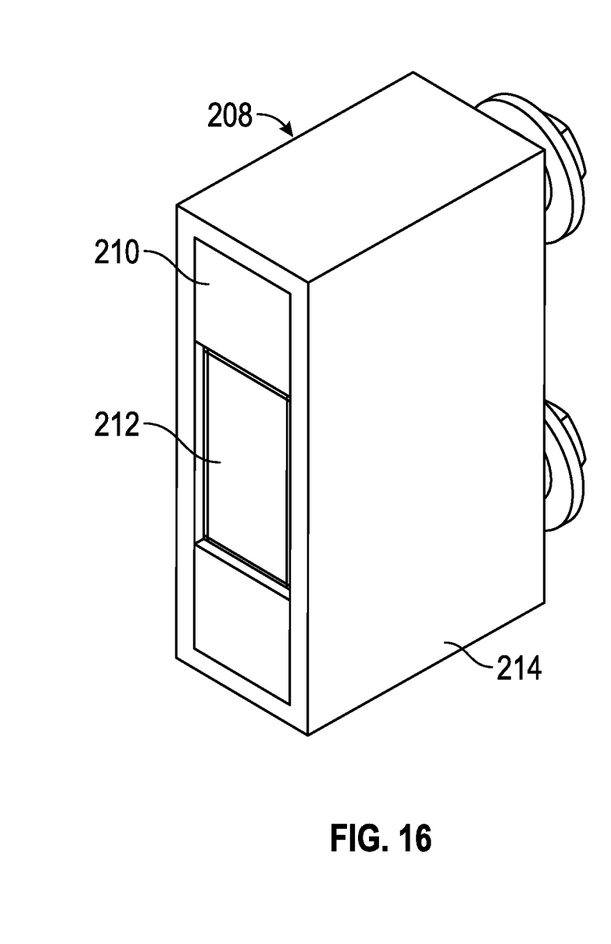
FIG. 16 is a perspective view of an electromagnetic portion of the brake member actuation mechanism of the braking system of FIG. 13.

As described in detail above with respect to alternative embodiments, an electronic sensor and/or control system (not illustrated) is configured to monitor various parameters and conditions of the hoisted structure and to compare the monitored parameters and conditions to at least one predetermined condition. In one embodiment, the predetermined condition comprises velocity and/or acceleration of the hoisted structure. In the event that the monitored condition (e.g., over-speed, over-acceleration, etc.) exceeds the predetermined condition, the brake actuator 54 is actuated to facilitate magnetic engagement of the brake actuator 54 and the guide rail 14. Actuation of the permanent magnet portion 202, and therefore the brake actuator 54, is achieved with an electromagnetic portion 208 (FIG. 16) of the brake member actuation mechanism 200. The electromagnetic portion 208 is formed of a core 210 surrounded by a coil 212 that is energized in response to a command from an electronic safety actuation control system. Upon reaching the energized condition, the coil 212 propels the brake actuator 54 toward the guide rail 14. Propulsion is achieved by the opposing magnetic force of the core 210 that is formed of a ferro-magnetic material, such as steel, and the brake actuator 54. The core 210 and the coil 212 are disposed within an electromagnetic component housing 214 that is attached to the outer component 68 described above.

Figure 17:
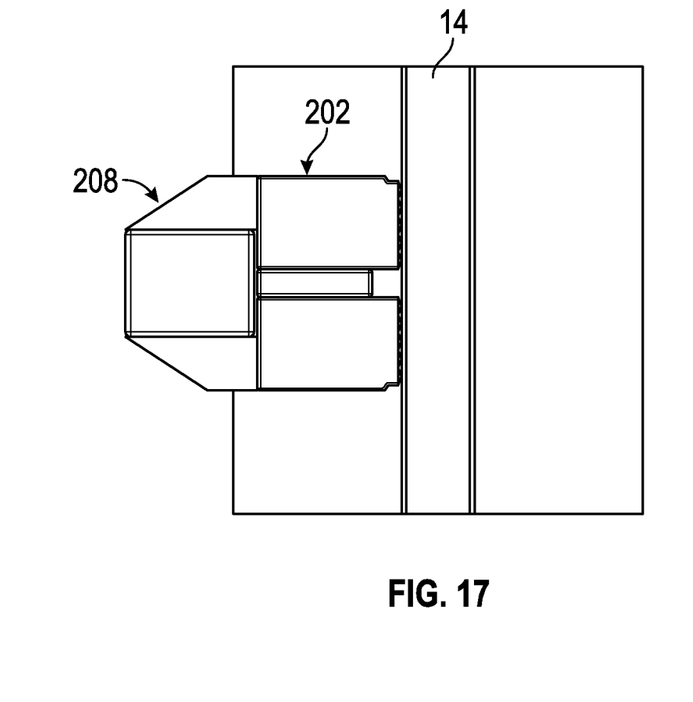
FIG. 17 is a side view of the brake member actuation mechanism of FIG. 13 according to one embodiment.
Figure 18:
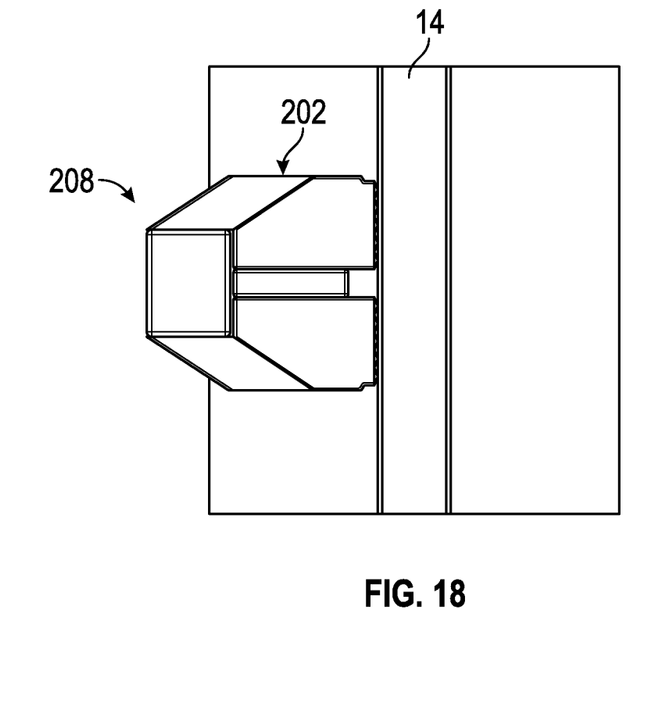
FIG. 18 is a side view of the brake member actuation mechanism of FIG. 13 according to another embodiment.

Referring to FIGS. 17 and 18, the overall geometry of the brake member actuation mechanism 200 may vary. FIG. 17 represents an embodiment having a relatively planar interface between the permanent magnet portion 202 and the electromagnetic portion 208. As shown in FIG. 18, the electromagnetic portion 208 may partially surround the permanent magnet portion 208. Such a surrounding geometry increases the propulsion force component normal to the guide rail 14, thereby requiring less magnetic force which allows for a smaller electromagnetic component.

Figure 19:
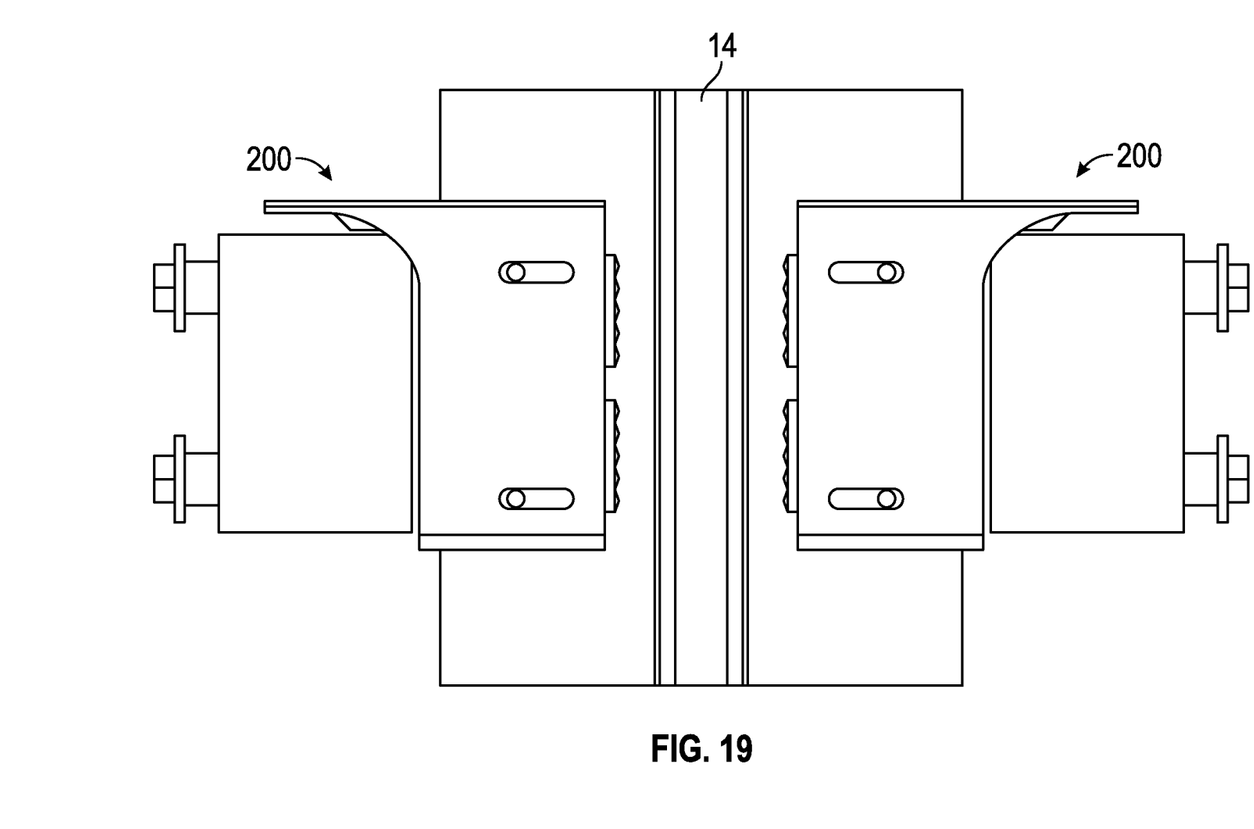
FIG. 19 is a side view of the brake member actuation mechanism of FIG. 13 in a symmetric configuration.

Referring to FIG. 19, as with all of the above-described embodiments, the brake member actuation mechanism 200 may be configured as a symmetric assembly, with brake member actuations mechanisms on opposing sides of the guide rail 14 or configured as an asymmetric assembly that only engages a single side of the guide rail 14.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A braking system for a hoisted structure comprising:
   a guide rail configured to guide movement of the hoisted structure;
   a first brake member operatively coupled to the hoisted structure and having a brake surface configured to frictionally engage the guide rail, the first brake member moveable between a braking position and a non-braking position with respect to an outer component; and
   a brake member actuation mechanism operatively coupled to the first brake member and configured to actuate the first brake member from the non-braking position to the braking position, the brake member actuation mechanism comprising:
      an electromagnetic portion secured in a fixed position with respect to the outer component, the electromagnetic portion including a coil;
      a permanent magnet portion including a brake actuator having a contact surface configured to engage the guide rail in the braking position, the permanent magnet portion moveable with respect to the outer component;
      wherein upon energizing the coil, the permanent magnet portion is directed towards the guide rail to place the contact surface in contact with the guide rail.

2. The braking system of claim 1, wherein the contact surface is configured to magnetically engage the guide rail.

3. The braking system of claim 1, wherein at least a portion of the contact surface includes a textured surface.

4. The braking system of claim 1, wherein the predetermined condition comprises at least one of an over-acceleration condition and an over-speed condition.

\* \* \* \* \*